United States Patent [19]
Dunn

[11] Patent Number: 5,999,996
[45] Date of Patent: Dec. 7, 1999

[54] ADAPTER FOR WIRELESSLY INTERFACING A FULL-SIZE STAND ALONE KEYBOARD WITH A HANDHELD COMPUTING DEVICE

[75] Inventor: Matthew W. Dunn, Seattle, Wash.

[73] Assignee: Microsoft Corporation, Redmond, Wash.

[21] Appl. No.: 08/843,168

[22] Filed: Apr. 14, 1997

[51] Int. Cl.⁶ .............................. G06F 13/10; G06F 3/02; H04B 10/00
[52] U.S. Cl. ................... 710/64; 710/12; 710/67; 359/152
[58] Field of Search ............... 359/152; 379/93.17; 364/709.01, 708.01; 395/884, 885, 893; 710/12, 64, 67

[56] References Cited

U.S. PATENT DOCUMENTS

| | | | |
|---|---|---|---|
| 5,184,314 | 2/1993 | Kelly et al. | 364/709.01 |
| 5,307,297 | 4/1994 | Iguchi et al. | 364/708.01 |
| 5,638,427 | 6/1997 | Flemming et al. | 379/93.17 |
| 5,668,654 | 9/1997 | Benjamin et al. | 359/152 |

FOREIGN PATENT DOCUMENTS 406153282A 5/1994 Japan ............................ H04Q 9/00

OTHER PUBLICATIONS

Lee Goldberg, "Infrared Data Transmission: The Missing Link?", Electronic Design, pp. 47–64, Apr. 17, 1995.

*Primary Examiner*—Thomas C. Lee
*Assistant Examiner*—Ilwoo Park
*Attorney, Agent, or Firm*—Lee & Hayes, PLLC

[57] ABSTRACT

An adapter is provided to interface a full-size keyboard with a handheld computing device. The adapter couples to the serial cable of the keyboard to convert keyboard generated signals to code, such as ASCII code. The adapter has a wireless transmitter (e.g., IR or RF transmitter) to transmit the code via a wireless link to a compatible receiver in the handheld computing device. The adapter enables a user to employ a full-size keyboard to enter data into a handheld computing device having a miniaturized or limited keypad.

29 Claims, 2 Drawing Sheets

ADAPTER FOR WIRELESSLY INTERFACING A FULL-SIZE STAND ALONE KEYBOARD WITH A HANDHELD COMPUTING DEVICE

TECHNICAL FIELD

This invention relates to adapters for handheld computing devices, such as handheld personal computers (H/PCs). More particularly, this invention relates to an adapter for interfacing a full-size, standalone keyboard to an H/PC.

BACKGROUND OF THE INVENTION

The popularity of small, handheld computing devices has grown steadily in recent years. The devices go by different names, including palmtops, pocket computers, personal digital assistants, and the like. In this disclosure, this class of computing devices is generally referred to as "handheld personal computers," or "H/PCs".

H/PCs are small, pocket-sized devices having an LCD (liquid crystal display) with a touch-sensitive screen, a miniature QWERTY keyboard, and a stylus. H/PCs are capable of running an operating system and one or more applications on the operating system. Microsoft Corporation recently released the Windows® CE operating system for use on H/PCs. Windows® CE which is a scaled-down version of its popular Windows® operating systems for personal computers.

Arguably the most desirable characteristic of H/PCs is their portability. H/PCs provide real computer-like applications—such as e-mail, scheduling, PIM (personal information management), spreadsheet, word processing—within a compact, portable device. Unfortunately, portability comes at the expense of certain design compromises.

Chief among the design compromises is an undersized keyboard. While the H/PC offers a complete QWERTY keyboard, it is miniaturized to satisfy the form factor requirements of H/PCs. Although the keyboard is serviceable for relatively small amounts of text entry, it is not as effective as a full-size keyboard. Most users cannot place both hands on the miniature keyboard in a normal home-row typing fashion, and enter data in conventional fashion. Instead, most users must enter data one character at a time, using a less preferred "hunt-and-peck" data entry method.

In view of this problem, it would be advantageous to develop a way to use a full-size keyboard in conjunction with an H/PC.

One possible solution is to take advantage of the IR (infrared) port implemented in most, if not all, H/PCs. Namely, the user employs an IR keyboard to enter data directly into the IR port of the H/PC. IR keyboards have existed for some time, although personal computers that use them require specialized design to receive the IR signals. The drawback of IR keyboards is that they are expensive. In addition, they are not conducive for portability and hence defeat the entire rational for owning a small portable H/PC. No traveling H/PC user would want to carry a full-size IR keyboard.

Accordingly, there remains a need to develop a solution which allows use of a full-size keyboard with an H/PC.

SUMMARY OF THE INVENTION

This invention concerns an adapter for interfacing a full-size keyboard with a handheld computing device, such as an H/PC. The adapter is configured to couple to the keyboard to convert keyboard generated signals into code and to transmit the code via a wireless link to the handheld computing device.

According to one implementation, the adapter has a keyboard input which can be connected to the serial connector or plug of the full-size keyboard. When connected to the keyboard plug, the keyboard input receives scan codes indicative of activated keys on the keyboard. A converter is coupled to the keyboard input to convert the scan codes into ASCII or special key codes. An infrared (IR) transmitter is coupled to the converter to transmit the ASCII/special-key codes via infrared to the IR port of the handheld computing device.

According to another implementation, the adapter employs an RF transmitter in place of the IR transmitter.

The adapter can be constructed with its own power supply, such as batteries, or with an AC adapter input into which an AC adapter can be plugged to deliver power.

BRIEF DESCRIPTION OF THE DRAWINGS

The same reference numbers are used throughout the drawings to reference like components and features.

DETAILED DESCRIPTION OF THE PREFERRED EMBODIMENT

Figure 1:
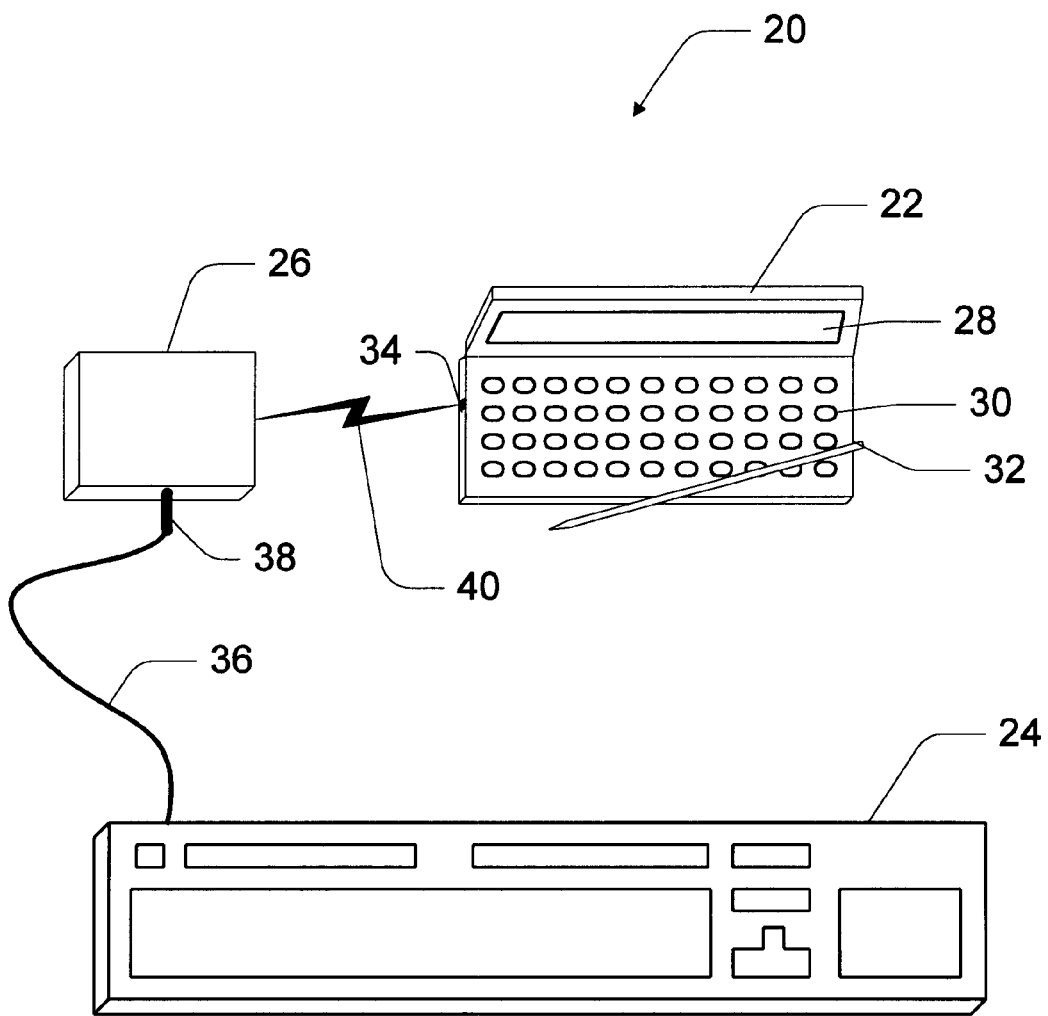
FIG. 1 is a diagrammatic illustration of an adapter that interfaces a full-size keyboard with a handheld computing device.

FIG. 1 shows a computing assembly 20 having a handheld computing device 22, a full-size standalone keyboard 24, and an adapter 26 for interfacing the keyboard 24 with the handheld computing device 22. As used herein, "handheld computing device" means a small computing device having a processing unit, a display, an input mechanism that is something other than a full-size keyboard, and a wireless receiver. The input mechanism might be a keypad, a touchscreen, a track ball, a touch sensitive pad, a miniaturized QWERTY keyboard, or the like. The wireless receiver might be implemented, for example, as an IR (infrared) receiver or an RF (radio frequency) receiver.

In FIG. 1, the handheld computing device 22 is embodied as a handheld personal computer (H/PC) having an LCD screen 28 with touchscreen, a miniature QWERTY keyboard 30, a stylus 32 for entering data through the touchscreen, and an IR port 34. In other implementations, the handheld computing device 22 may be implemented as a personal digital assistant (PDA), a palmtop computer, or other computing device where full-size keyboards are impermissible due to size constraints.

The handheld computing device 22 preferably runs the Windows® CE operating system from Microsoft Corporation. This operating system is a derivative of Windows® brand operating systems, such as Windows® 95, that is especially designed for handheld computing devices. However, the handheld computing device may be implemented with other operating systems, or without any operating system.

The keyboard 24 is a full-size standalone keyboard, such as a conventional 101-key keyboard. Additionally, the keyboard might be configured as a full-size ergonomic keyboard, such as the Natural™ Keyboard sold by Microsoft Corporation. The keyboard 24 has a serial cable 36 with a standard plug 38, such as a conventional PS2 keyboard plug or an AT-style keyboard plug.

The adapter 26 connects to the keyboard 24 to convert keyboard generated signals to data signals that can be transmitted to the handheld computing device 22 via a wireless data link 40. The adapter 26 has a keyboard input that compatibly receives the keyboard plug 38. In this manner, the adapter can be alternately connected to and disconnected from the keyboard plug 38 of the full-size keyboard 24. When the adapter 26 is connected to the keyboard 22, the adapter receives the scan codes generated by the keyboard as the user depresses and releases keys on the keyboard.

Figure 2:
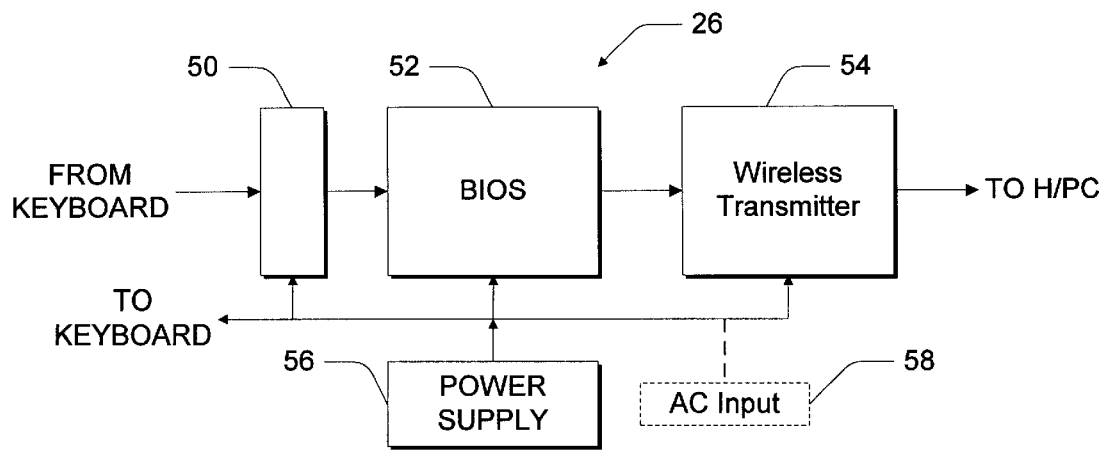
FIG. 2 is a block diagram of the adapter.

FIG. 2 shows the adapter 26 in more detail. It has a buffer 50 to temporarily store the scan code received at the keyboard input according to a first in, first out (FIFO) protocol. A converter 52 is coupled to the buffer to convert the scan code to an ASCII code. In the preferred implementation, the converter 52 is a BIOS chip which reads the scan code from the keyboard port and sends a signal back to the keyboard to tell the keyboard it can delete the scan code from its buffer. Although shown separately, the converter 52 and buffer 50 are typically implemented in the same BIOS chip.

If the scan code is for one of the ordinary shift keys or for one of the keys that are considered to be special shift keys and toggle keys (i.e., Ctrl, Alt, Num Locks, Caps Lock, Scroll Lock, Insert, etc.), the BIOS chip changes two bytes in a special area or memory to maintain a record of which of these keys has been pressed. For all other keys, the BIOS chip checks those bytes to determine the status of the shift and toggle keys. Depending on the status indicated by those bytes, the BIOS chip translates the appropriate scan code into an ASCII code that stands for a character or into a special code for a function key or a cursor movement key. Uppercase and lowercase characters have different ASCII codes. In either case, the BIOS chip places the ASCII or special key code into its own memory buffer.

A wireless transmitter 54 is coupled to the converter 52 to transmit the ASCII or special key code to the handheld computing device. Preferably, the wireless transmitter 54 is an IR transmitter that operates according to the IrDA (Infrared Developers Association) standard. An IR transmitter is capable of sending 38 Kbps, which is more than sufficient for keyboard use. The Windows® CE operating system supports the IrDA standard. It is noted that the wireless transmitter 54 may also be implemented as an RF transmitter.

The adapter 26 may further be equipped with a power supply 56 to provide power to the buffer 50, BIOS 52, and transmitter 54. Additionally, the power supply 56 supplies power to the keyboard. In one implementation, the power supply 56 is a battery. In another implementation, the adapter is configured with an AC adapter input 58 to receive power from an AC adapter. The AC adapter input 58 may be provided in addition to, or in place of, the power supply 56.

The adapter is a very useful tool to the traveling user. It allows a user to enter data into his/her handheld computing device from a conventional full-size keyboard. The user need not hassle with the miniaturized keyboard on the handheld computing device, nor go through the trouble of porting a full-size IR keyboard. Instead, the user simply carries the handheld computing device and the small, compact adapter (and possibly an AC adapter). The user can then use any available conventional keyboard. There are millions of keyboards in existence, and virtually every hotel and business has available keyboards.

When the user arrives at a place, the user locates a full-size keyboard and connects the adapter 26 to the serial connector. The adapter is oriented relative to the handheld computing device to align the IR ports of the adapter and computing device. (If RF transceivers are used, no orientation is needed.) If the adapter requires an AC adapter, that too is connected to provide power to the adapter and keyboard.

When the user depresses or releases a key on the keyboard, a change in current is created in circuits associated with the key. A microprocessor in the keyboard constantly scans the circuits to detect such current changes in relation to keys. The microprocessor detects from the current change whether the key has been depressed or released. The microprocessor generates scan codes for each key that is depressed and released. Each key has a unique set of scan codes. The scan code is placed in a buffer in the keyboard and the microprocessor sends an interrupt signal to the adapter 26 to tell the BIOS 52 that a scan code is waiting. This process of generating scan codes is conventional and well-known.

Figure 3:
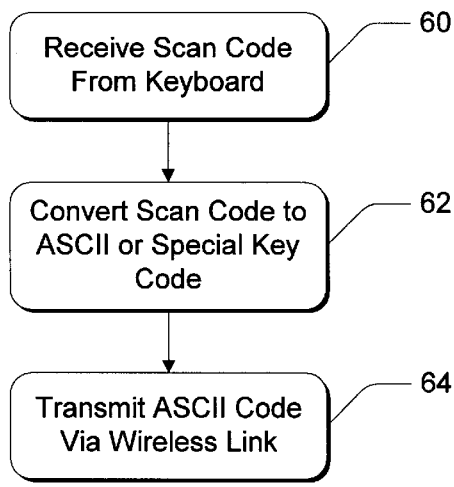
FIG. 3 is a flow diagram of the steps in a method for inputting data into a handheld computing device from a full-size keyboard.

FIG. 3 shows a process for entering data from a full-size keyboard 24 into a handheld computing device 22 using the adapter 26. The BIOS 52 reads or otherwise receives the scan code from the keyboard buffer (step 60 in FIG. 3). The BIOS informs the keyboard to delete the scan code from its buffer. The BIOS 52 evaluates the scan code for special modifiers, and then converts the scan code into an ASCII or special key code (step 62 in FIG. 3). The IR transmitter transmits the ASCII or special key code via the IR link to the IR port of the handheld computing device (step 64 in FIG. 3). The handheld computing device 22 places the ASCII or special key code in a buffer for use by the operating system or application(s) executing on the operating system.

The invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

I claim:

1. An adapter for interfacing a portable handheld electronic computing device with a standalone keyboard, comprising:

a keyboard port for coupling to the standalone keyboard to receive keyboard generated signals;

a converter coupled to the keyboard port to convert the keyboard generated signals to converted signals; and a wireless transmitter coupled to the converter to transmit the converted signals to the handheld electronic computing device.

2. An adapter as recited in claim 1 wherein the transmitter comprises an IR transmitter.

3. An adapter as recited in claim 1 wherein the transmitter comprises an RF transmitter.

4. An adapter as recited in claim 1 further comprising a power supply coupled to supply power to the converter and the transmitter.

5. An adapter as recited in claim 1 further comprising an AC adapter input.

6. An adapter for interfacing a portable handheld computing device with a full-size standalone QWERTY keyboard, comprising:

a keyboard input alternately connectable to and disconnectable from a keyboard plug of a full-size standalone QWERTY keyboard, the keyboard input receiving a scan code indicative of an activated key on the keyboard when the keyboard input is connected to the keyboard plug;

a converter coupled to the keyboard input to convert the scan code into an ASCII/special-key code; and an infrared transmitter coupled to the converter to transmit the ASCII/special-key code via infrared to the handheld computing device.

7. An adapter as recited in claim 6, wherein the converter comprises a BIOS integrated circuit.

8. An adapter as recited in claim 6 further comprising a power supply coupled to supply power to the converter and the infrared transmitter.

9. An adapter as recited in claim 6 further comprising an AC adapter input.

10. An adapter for interfacing a keyboard with a handheld electronic computing device, the adapter being configured to couple to the keyboard to convert keyboard generated signals to code and to transmit the code via a wireless link to the handheld electronic computing device.

11. An adapter as recited in claim 10, comprising an IR transmitter.

12. An adapter as recited in claim 10, comprising an RF transmitter.

13. An adapter as recited in claim 10, comprising a power supply.

14. An adapter as recited in claim 10, comprising an AC adapter input.

15. An assembly comprising:

a handheld electronic computing device equipped with a wireless receiver; and a keyboard adapter for coupling to a full-size standalone keyboard to convert keyboard generated signals to code and to transmit the code via a wireless link to the wireless receiver of the handheld electronic computing device.

16. An assembly as recited in claim 15, wherein:

the wireless receiver in the handheld electronic computing device comprises an IR receiver; and the keyboard adapter is equipped with an IR transmitter to transmit the code via an IR link to the IR receiver.

17. An assembly as recited in claim 15, wherein:

the wireless receiver in the handheld electronic computing device comprises an RF receiver; and the keyboard adapter is equipped with an RF transmitter to transmit the code via an RF link to the RF receiver.

18. A computing assembly as recited in claim 15, wherein the keyboard adapter includes a power supply.

19. An assembly comprising:

a full-size standalone keyboard having a serial cable; and an adapter configured to be connected to the keyboard cable to convert keyboard generated signals to code, the adapter comprising a wireless transmitter to transmit the code via a wireless link to a handheld electronic computing device.

20. A computing assembly as recited in claim 19, wherein the keyboard comprises an ergonomic, full-size keyboard.

21. A computing assembly as recited in claim 19, wherein the wireless transmitter comprises an IR transmitter.

22. A computing assembly as recited in claim 19, wherein the wireless transmitter comprises an RF transmitter.

23. A computing assembly as recited in claim 19, wherein the adapter includes a power supply.

24. A method for inputting data into a portable handheld electronic computing device from a full-size standalone keyboard, the portable handheld electronic computing device being equipped with a wireless receiver, the method comprising the following steps:

receiving keyboard generated signals as they are output by the keyboard;

converting the keyboard generated signals to code; and transmitting the code via a wireless link to the wireless receiver of the handheld electronic device.

25. A method as recited in claim 24, wherein the transmitting step comprises the step of transmitting the code as an IR signal.

26. A method as recited in claim 24, wherein the transmitting step comprises the step of transmitting the code as an RF signal.

27. A standalone adapter for interfacing a standalone keyboard with a handheld electronic computing device, the standalone adapter comprising:

a keyboard port for coupling to the standalone keyboard to receive keyboard generated signals;

a converter coupled to the keyboard port to convert the keyboard generated signals to converted signals;

a wireless transmitter coupled to the converter to transmit the converted signals to the handheld electronic computing device without a physical connection between the adapter and the computing device; and an encasing to package the keyboard port, the converter, and the wireless transmitter within a single integrated device.

28. A standalone adapter as recited in claim 27, further comprising a power supply to power the converter and the wireless transmitter.

29. An assembly comprising:

a handheld computing device having a wireless receiver;

a full size standalone keyboard having a standard serial connector; and, an adapter to interface the full size keyboard to the handheld computing device, the adapter being detachably coupleable to the keyboard so that the keyboard can be alternately coupled to and decoupled from the adapter, the adapter having, an independent power supply, a keyboard input port into which the keyboard connector is coupled for receiving keyboard generated signals output from the full size keyboard, a converter coupled to the keyboard port to convert the keyboard generated signals to converted signals, and a wireless transmitter coupled to the converter to transmit the converted signals to the handheld computing device without a physical connection between the adapter and the computing device.

* * * * *